(12) United States Patent
Pavlou

(10) Patent No.: US 11,483,164 B2
(45) Date of Patent: Oct. 25, 2022

(54) DYNAMIC CERTIFICATE PINNING SYSTEMS AND METHODS

(71) Applicant: Citrix Systems, Inc., Ft. Lauderdale, FL (US)

(72) Inventor: Chris Pavlou, Boca Raton, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 462 days.

(21) Appl. No.: 16/446,437

(22) Filed: Jun. 19, 2019

(65) Prior Publication Data

US 2020/0403811 A1 Dec. 24, 2020

(51) Int. Cl.
*H04L 9/32* (2006.01)
*H04L 9/40* (2022.01)

(52) U.S. Cl.
CPC .......... *H04L 9/3268* (2013.01); *H04L 63/166* (2013.01); *H04L 2463/082* (2013.01)

(58) Field of Classification Search
CPC ............. H04L 65/1069; H04L 63/0823; H04L 9/3268; H04L 63/166; H04L 2463/082
USPC .......................................................... 713/156
See application file for complete search history.

(56) References Cited

U.S. PATENT DOCUMENTS

| | | | | |
|---|---|---|---|---|
| 10,831,370 B1* | 11/2020 | Shilane | .................. | G06F 3/0661 |
| 2012/0023241 A1* | 1/2012 | Goel | ..................... | H04W 76/19 |
| | | | | 709/228 |
| 2014/0283054 A1* | 9/2014 | Janjua | ................. | H04L 63/1408 |
| | | | | 726/23 |
| 2017/0230355 A1* | 8/2017 | Su | ........................ | H04L 63/0823 |
| 2018/0367530 A1* | 12/2018 | Mistry | ............... | H04L 61/2015 |
| 2019/0379656 A1* | 12/2019 | Gore | ................... | H04L 63/0815 |
| 2020/0045015 A1* | 2/2020 | Nukala | ............... | H04L 63/1416 |

OTHER PUBLICATIONS

"TLS Certificate Pinning 101—Nettitude Labs"; Retrieved online URL:<https://labs.nettitude.com/tutorials/tls-certificate-pinning-101/>; Retrieved online Sep. 17, 2019; 7pgs.
Lee Munson, "What is SSL Session Reuse?"; Retrieved online URL:<http://www.security-faqs.com/what-is-ssl-session-reuse.html>;Retrieved online Sep. 17, 2019; 4 pgs.

* cited by examiner

*Primary Examiner* — Michael S McNally
(74) *Attorney, Agent, or Firm* — Finch & Maloney PLLC

(57) ABSTRACT

A computer system including a memory, a network interface, and at least one processor is provided. The at least one processor can transmit, via the network interface, a first message to a server application to initiate a handshake process; receive, via the network interface, a first copy of a security certificate from the server application; determine whether the first copy is valid; store, in response to a determination that the first copy is valid, the first copy in the memory; establish an initial secure connection to the server application; transmit, via the network interface, a second message to the server application to request a subsequent secure connection to the server application; receive, via the network interface, a second copy of the security certificate from the server application; determine whether the second copy matches the first copy; and establish the subsequent secure connection to the server application.

17 Claims, 5 Drawing Sheets

DYNAMIC CERTIFICATE PINNING SYSTEMS AND METHODS

BACKGROUND

Some communication protocols can be used to implement security at the application layer of a network protocol stack, for example such as in the Open Systems Interconnection (OSI) model. Examples of these communication protocols include transport layer security (TLS) and secure sockets layer (SSL). Applications, such as TLS peers, complying with these protocols use symmetric cryptography to transmit encrypted data over the network, thereby ensuring that communications between the applications are kept private. To implement symmetric cryptography, the applications first execute a handshake process in which the applications negotiate an encryption/decryption process and cryptographic keys to use within a communication session. Once this negotiation is complete, the communication session is established, and the applications can securely exchange information within it.

SUMMARY

In at least one example, a computer system is provided. The computer system includes a memory, a network interface, and at least one processor coupled to the memory and the network interface. The at least one processor is configured to transmit, via the network interface, a first message to a server application to initiate a handshake process with the server application; receive, via the network interface, a first copy of a security certificate from the server application; determine whether the first copy is valid; store, in response to a determination that the first copy is valid, the first copy in the memory; establish, in response to the determination that the first copy is valid, an initial secure connection to the server application; transmit, via the network interface, a second message to the server application to request a subsequent secure connection to the server application; receive, via the network interface, a second copy of the security certificate from the server application; determine whether the second copy matches the first copy; and establish, in response to a determination that the second copy matches the first copy, the subsequent secure connection to the server application.

At least some examples of the computer system can include one or more of the following features. In the computer system, the at least one processor can be configured to determine whether the second copy matches the first copy by comparing the second copy to the first copy byte-by-byte. The subsequent secure connection can be a low-level connection. In some instances, the memory stores no copies of the security certificate prior to transmitting the first message. The at least one processor can be further configured to determine, in response to a determination that the second copy does not match the first copy, whether the subsequent secure connection is a high-level connection; determine, in response to a determination that the subsequent secure connection is a high-level secure connection, whether the second copy is valid; and store, in response to a determination that the second copy is valid, the second copy in the memory. To determine whether the first copy is valid can include to execute a full transport layer security validation of the first copy. The at least one processor can be further configured to establish, in response to the determination that the first copy is valid, a secure communication session with the server application, the secure communication session comprising the initial secure connection; and add, in response to the determination that the second copy matches the first copy, the subsequent secure connection to the secure communication session. The secure communication session can include an expiration time.

In another example, a method of establishing secure connections is provided. The method uses dynamic pinning within a computer system. The method includes acts of transmitting, via a network interface of the computer system, a first message to a server application to initiate a handshake process with the server application; receiving, via the network interface, a first copy of a security certificate from the server application; determining whether the first copy is valid; storing, in response to a determination that the first copy is valid, the first copy in a memory of the computer system; establishing, in response to the determination that the first copy is valid, an initial secure connection to the server application; transmitting, via the network interface, a second message to the server application to request a subsequent secure connection to the server application; receiving, via the network interface, a second copy of the security certificate from the server application; determining whether the second copy matches the first copy; and establishing, in response to a determination that the second copy matches the first copy, the subsequent secure connection to the server application.

At least some examples of the method can include one or more of the following features. In the method, the act of determining whether the second copy matches the first copy can include an act of the second copy to the first copy byte-by-byte. The act of transmitting the second message to the server application can include an act of transmitting a second message to request a low-level connection. The method can further include acts of determining, in response to a determination that the second copy does not match the first copy, whether the subsequent secure connection is a high-level connection; determining, in response to a determination that the subsequent secure connection is a high-level secure connection, whether the second copy is valid; and storing, in response to a determination that the second copy is valid, the second copy in the memory. The act of determining whether the first copy is valid can include an act of executing a full transport layer security validation of the first copy. The method can further include acts of establishing, in response to the determination that the first copy is valid, a secure communication session with the server application, the secure communication session comprising the initial secure connection; and adding, in response to the determination that the second copy matches the first copy, the subsequent secure connection to the secure communication session. The act of establishing the secure communication session can include an act of storing an expiration time in association with the secure communication session.

In another example, a non-transitory computer readable medium is provided. The computer readable medium stores executable sequences of instructions to establishing secure connections using dynamic pinning. The sequences of instructions include instructions to transmit, via a network interface, a first message to a server application to initiate a handshake process with the server application; receive, via the network interface, a first copy of a security certificate from the server application; determine whether the first copy is valid; store, in response to a determination that the first copy is valid, the first copy in a memory; establish, in response to the determination that the first copy is valid, an initial secure connection to the server application; transmit, via the network interface, a second message to the server application to request a subsequent secure connection to the server application; receive, via the network interface, a second copy of the security certificate from the server application; determine whether the second copy matches the first copy; and establish, in response to a determination that the second copy matches the first copy, the subsequent secure connection to the server application.

At least some examples of the computer readable medium can include one or more of the following features. In the computer readable medium, the instructions to transmit the second message to the server application can include instructions to transmit a second message to request a low-level connection. The sequences of instructions further include instructions to determine, in response to a determination that the second copy does not match the first copy, whether the subsequent secure connection is a high-level connection; determine, in response to a determination that the subsequent secure connection is a high-level secure connection, whether the second copy is valid; and store, in response to a determination that the second copy is valid, the second copy in the memory. The sequences of instructions further include instructions to establish, in response to the determination that the first copy is valid, a secure communication session with the server application, the secure communication session comprising the initial secure connection; and add, in response to the determination that the second copy matches the first copy, the subsequent secure connection to the secure communication session. The instructions to establish the secure communication session can include instructions to store an expiration time in association with the secure communication session.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
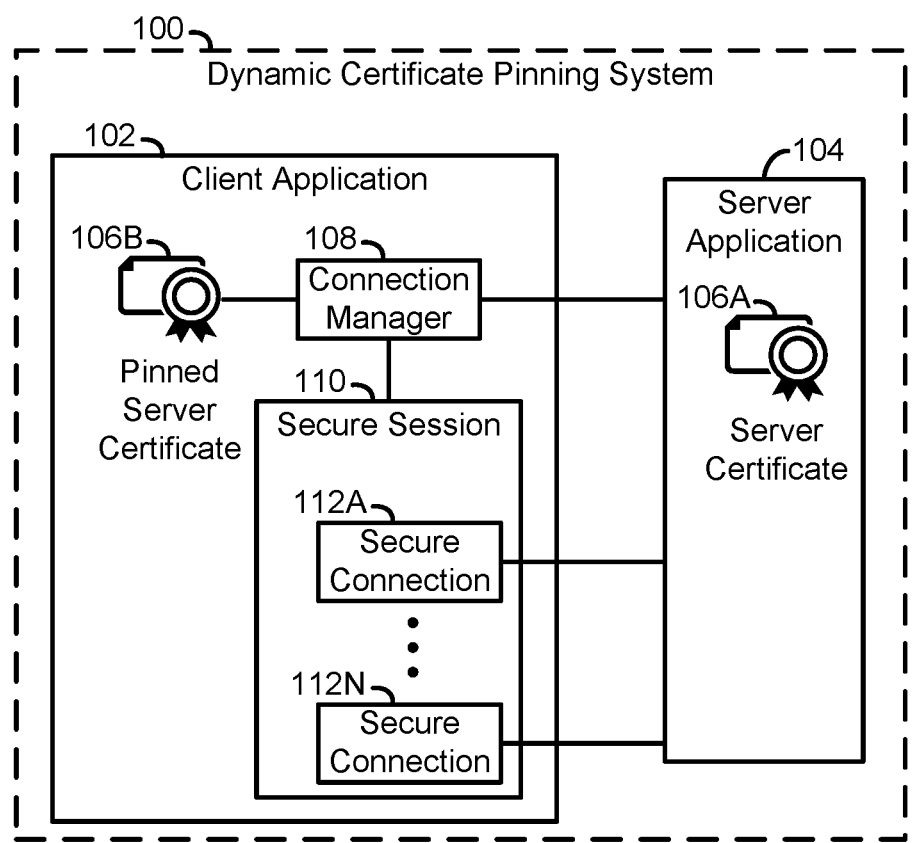
FIG. 1 is a block diagram of a dynamic certificate pinning system in accordance with an example of the present disclosure.

As summarized above, some examples disclosed herein implement dynamic certificate pinning and/or re-pinning systems and methods. These examples address security and performance problems that can arise, for instance, where an application establishes multiple secure connections to a TLS peer. Such multiple secure connections to a TLS peer can be established using a variety of techniques. For instance, some TLS peers fully validate, or revalidate, security certificates for each TLS connection to be established. Other TLS peers establish an initial TLS connection within the context of a server-controlled session to which subsequent TLS connections can be added without a full validation until the session expires. Still other TLS peers rely on copies of certificates generated and embedded within the TLS peers at build time and validate TLS connections using the embedded certificates.

These multiple-connection techniques suffer from technical shortcomings. For example, full validation or revalidation of the certificate of a server for each subsequent TLS connection can be costly. For instance, in some situations, an application can require between 250-500 milliseconds to fully validate a certificate of a peer. TLS session reuse can decrease the time required to establish a subsequent TLS connection to as little as 150 milliseconds. However, for an application to implement TLS session reuse, its TLS peer must support TLS session reuse. Moreover, under the TLS session reuse paradigm, the TLS peer determines whether the TLS session can be reused for the subsequent connection. This creates a security vulnerability for the application. Furthermore, while embedding copies of certificates at build time can provide for efficient TLS validation, this technique limits efficient validation to a pre-determined list of peers and requires distributing updates to the application as renewed peer certificates become available.

Thus, and in accordance with at least some examples disclosed herein, dynamic pinning systems and methods are provided. These dynamic pinning systems and methods can establish multiple secure network connections by leveraging a single full validation of a security certificate across multiple secure connections. More specifically, in some examples, a client application can store in memory, or "pin," a security certificate of a server application in response to fully validating the security certificate. The client application can fully validate the security certificate using, for example, TLS processes. Further, in these examples, the client application can establish a secure communication session in response to full validation of the security certificate. Once this client-driven secure communication session is established and the security certificate of the server is pinned, the client application can validate subsequent requests for subsequent secure connections using an abbreviated validation process. In this abbreviated validation process, the client application can compare the pinned certificate to subsequent security certificates acquired for the subsequent secure connections. Where a subsequent certificate matches the pinned certificate, the subsequent secure connection corresponding to the subsequent certificate is validated and established within the secure communication session. Where a subsequent certificate does not match the pinned certificate, the subsequent secure corresponding to the subsequent certificate is not validated nor established within the secure communication session.

In some examples, when executing the abbreviated validation process, the client application can determine, in the case of mismatching certificates, whether the subsequent secure connection can be easily validated. For instance, a subsequent secure connection that is a TLS or SSL connection can be easily validated by executing standardized library routines. If the subsequent secure connection can be easily validated, the client application can attempt to do so. Subsequent secure connections validated in this manner can be established within the secure communication session and their corresponding security certificates can be re-pinned and associated with the secure communication session. Subsequent secure connections that cannot be validated cannot be established within the secure communication session. In some examples, the client application can further terminate the secure communication session, and optionally including all secure connections with the secure communication session, when security certificates for subsequent secure connections cannot be matched or validated.

The abbreviated, comparison-based validation process implemented by the dynamic pinning systems described herein provides for several advantages. For instance, the abbreviated validation process validates subsequent secure connections more efficiently than full validation because the abbreviated validation process it is less computationally intense and does not require additional network interaction. Moreover, the abbreviated validation process enables easy validation of low-level connections that does not support full TLS/SSL validation, thereby avoiding custom validation processes that require ongoing maintenance. In addition, the abbreviated validation process is not limited to a predetermined list of servers. These advantages, and other advantages, will be apparent in view of this disclosure.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Dynamic Certificate Pinning Architecture

In some examples, a dynamic security certificate pinning system is configured to pin, or store, a copy of a certificate in a secure memory location in response to validating the certificate as part of a handshake process. In these examples, the dynamic pinning system is configured to access the pinned certificate when establishing subsequent secure connections within a secure communication session. FIG. 1 illustrates a logical architecture of a dynamic certificate pinning system 100 in accordance with these examples. As shown in FIG. 1, the system 100 includes a client application 102 and a server application 104. The server application 104 includes a server security certificate 106A. The certificate 106A can be stored (and optionally encrypted), for example, in private memory allocated for the exclusive use of the server application 104. The client application 102 includes a connection manager 108, a pinned copy of the server security certificate 106B, and an established secure communication session 110. The pinned certificate 106B can be stored (and optionally encrypted), for example, in private memory allocated for the exclusive use of the client application 102. The session 110 includes, in some examples, an expiration time that specifies a future time at which the session 110 terminates. This expiration time can be, for example, an expiration time of the pinned certificate 106B. The session 110 also includes multiple established secure connections 112A through 112N. The secure connections 112A through 112N may be referred to collectively as the connections 112 and any one of the secure connections 112A through 112N may be referred to as a connection 112. The connections 112 can include high-level, sophisticated secure connections (e.g., TLS or SSL connections) and low-level, less sophisticated connections (e.g., raw sockets, UDP sockets, TCP connections, etc.). The connections 112 can be utilized to support a wide variety of application functionality, such as displaying web pages, providing user access to virtual machines and applications, and/or streaming of content from the server application 104 to the client application 102.

In some examples, the client application 102 is a software application configured to interoperate securely with the server application 104 over a potentially insecure and untrusted network. Thus, the client application 102 can be, for example, a browser, email client, virtualization client, or the like. In these examples, the server application 104 is a software application configured to interoperate with the client application 102 over the potentially insecure and untrusted network. Thus, the server application 104 can be, for example, a web server, email server, virtual machine, virtual application server, or the like.

In certain examples, the connection manager 108 is configured to establish the session 110 and the connections 112 as part of or on behalf of other processes executing within the client application 102. In these examples, the other processes are configured to provide the connection manager 108 with an identifier of the server, an identifier of the type of secure connection, and a duration for the connection. To establish the session 110, the connection manager 108 is configured to execute a handshake process, such as a TLS or SSL handshake process, in which the connection manager 108 exchanges messages with the server application 104. The client application 102 and the server application 104 are configured to exchange security certificates and authenticate one another through these messages. Thus, the server application 104 is configured to, as part of the handshake process, transmit the certificate 106A to the connection manager 108. The connection manager 108, in turn, is configured to receive the certificate 106A and attempt to validate the certificate 106A.

In some examples, the connection manager 108 is configured to validate the certificate 106A via execute a validation process that varies depending on the type of the connection 112 to be established. For instance, where the type of connection 112 is a TLS connection, the connection manager 108 is configured to call TLS library functions to validate the certificate 106A. Alternatively, in some examples, where the type of connection 112 is a low-level secure connection (e.g., a circuit Transmission Control Protocol (TCP) connection or a User Datagram Protocol (UDP) connection), the connection manager 108 is configured to execute a custom validation process. The connection manager 108 is further configured to validate and establish an initial connection 112A to the server application where the connection manager 108 successfully validates the certificate 106A.

In some examples, the connection manager 108 is configured to establish the session 110 as part of establishing the initial connection 112A. For instance, the connection manager 108 can be configured to establish the connection 112A by storing a connection record in memory. The connection record can have fields storing values that identify the connection, the connection type, and the session identifier of the session to which the connection belongs. Further, the connection manager 108 can be configured to establish the session 110 by storing a session record in memory. The session record can have fields storing a server identifier, a session identifier, and an expiration time.

In some examples, the connection manager 108 is configured to store, in association with a session record, the pinned certificate 106B in secure memory accessible to the client application 102. This memory may include, for example, private memory allocated to the client application 102 by an operating system of a computing platform, as described below with reference to FIG. 4. It should be noted that, in at least some examples, no security certificate for the server application 104 exists in memory locally accessible to the client application 102 prior to storage of the pinned certificate 106B.

In certain examples, the connection manager 108 is configured to validate security certificates corresponding to subsequent connections 112B-112N by comparing subsequently received certificates corresponding to the subsequent connections 112B-112N to the pinned certificate 106B. In these examples, the connection manager 108 is further configured to add subsequent connections 112B-112N to the session 110 in response to matching subsequently received certificates corresponding the subsequent connections 112B-112N to the pinned certificate 106B.

In some examples, to handle subsequently received certificates that fail to match the pinned certificate 106B, the connection manager 108 is further configured to determine whether a subsequent connection 112 corresponding to a mismatching subsequently received certificate can be easily validated. For instance, in some examples, where the subsequent connection 112 is to be a high-level connection, the connection manager 108 determines that the subsequent connection can be easily validated. Conversely, where the subsequent connection 112 is to be a low-level connection, the connection manager 108 determines that the subsequent connection cannot be easily validated. In these examples, the connection manager 108 is further configured to attempt to validate (e.g., by a full validation of the subsequently received certificate) the subsequent secure connection, where the subsequent secure connection can be easily validated. Further, in these examples, the connection manager is configured to not attempt to validate the subsequent secure connection, where the subsequent secure connection cannot be easily validated. The connection manager 108 can be further configured to terminate the session 110 where a subsequently received certificate cannot be fully validated or matched.

The comparison-based validation process that the connection manager 108 is configured to execute enables it to establish new secure connections to the server application 104 more rapidly and with greater security than other certificate validation techniques. These advantages stem, at least in part, from client control of the validation process and the relative computational ease of comparing the subsequently received certificates to the pinned certificate 106B vis-à-vis fully validating the subsequently received certificates. Examples of processes that the connection manager 108 is configured to execute are described further below with reference to FIGS. 2, 3, and 5.

Dynamic Certificate Pinning Processes

Figure 2:
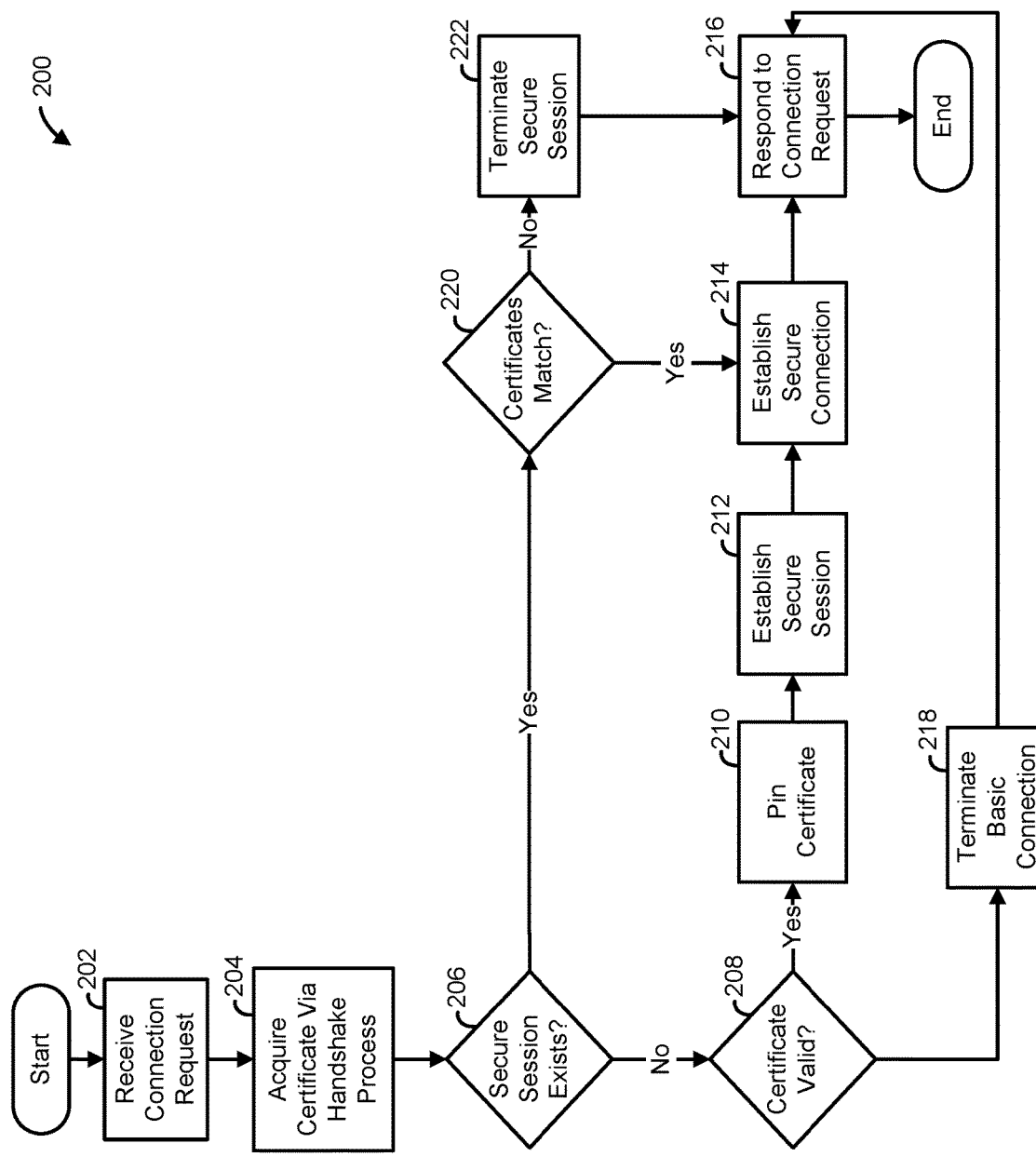
FIG. 2 is a flow diagram of a dynamic certificate pinning process in accordance with an example of the present disclosure.

As described above, some examples of the system 100 of FIG. 1 are configured to execute dynamic certificate pinning processes. These processes may be executed via one or more processors of any suitable type (e.g., processor 403 of FIG. 4, which is described further below). FIG. 2 illustrates a dynamic pinning process 200 executed by the system 100 in some examples.

The process 200 starts with a connection manager (e.g., the connection manager 108 of FIG. 1) implemented within a client application (e.g., the client application 102 of FIG. 1) receiving 202 a request to establish a connection with a server application (e.g., the server application 104 of FIG. 1). This connection request can originate, for example, from another process implemented within the client application that is configured to interoperate securely with the server via one or more secure connections (e.g., the connections 112 of FIG. 1). In at least one example, the connection request is a function call that invokes the connection manager and provides the connection manager with arguments that identify the server and the type of secure connection requested.

In response to receiving the connection request, the connection manager acquires 204 a security certificate (e.g., the certificate 106A of FIG. 1) from the server via a handshake process. For example, the connection manager can transmit an introductory message to the server to establish a basic (and potentially unsecure) connection with the server. The connection manager can request a copy of the server's certificate via the basic connection and can receive a response message from the server that includes the requested copy.

Next, the connection manager determines 206 whether a secure communication session (e.g., the session 110 of FIG. 1) exists between the client and the server. For example, the connection manager can search a data structure housed in memory for a session record that includes an identifier of the server and can determine 206 that a secure communication session with the server exists where the connection manager locates a session record storing the identifier of the server that is not expired.

Where no secure communication session exists between the client and the server, the connection manager determines 208 whether the security certificate is valid. For example, where the connection request received by the connection manager specifies a TLS connection, the connection manager can perform a full TLS validation by calling various standardized TLS library functions. The connection manager can determine 208 that the security certificate is either valid or invalid as indicated by the full TLS validation process. Where the connection request specifies a low-level connection, such as a basic TCP circuit or a UDP connection, the connection manager can determine 208 that the security certificate is either valid or invalid by executing a custom validation via internal routines within the client. Alternatively or additionally, the connection manager can determine 208 that the security certificate is not valid where the connection request specifies a low-level connection.

Where the connection manager determines 208 that the certificate is not valid, the connection manager terminates 218 the basic connection and responds 216 to the connection request with an indication of failure to establish a secure connection with the server. For example, where the connection manager is invoked via a function call executed by another process within the client, the connection manager returns a value that indicates an inability to establish a secure connection to the calling process and the process 200 ends.

Where the connection manager determines 208 that the certificate is valid, the connection manager pins 210 the certificate in memory. For example, the connection manager can store a pinned certificate (e.g., the pinned certificate 106B) in software or hardware secured memory private to the client.

Next, the connection manager interoperates with the server to establish 212 a secure communication session. For example, the client can transmit a message to the server that accepts an encryption/decryption process to be implemented by both the client and server within the secure communication session. Alternatively, the client can transmit a message that proposes a new or different encryption/decryption process. In addition, the client can receive a message from the server that includes an identifier of the secure communication session (e.g., after the encryption/decryption process has been finalized). In response to receiving the message including this session identifier or after generating a session identifier and corresponding expiration time, the client can store a record in the memory that includes the session identifier, the expiration time, and an identifier of the server. This record can be subsequently accessed by the connection manager to determine 204 whether a secure communication session exists between the client and the server.

The connection manager establishes 214 the secure connection between the client and the server requested in the received connection request. For example, the connection manager may store a record in the memory that identifies the server and the encryption/decryption process associated with this particular secure connection between the client and the server.

Next, the connection manager responds 216 to the to the connection request with an indication of success in establishing a secure connection with the server. For example, where the connection manager is invoked via a function call executed by another process within the client, the connection manager returns a value that indicates success establishing the secure connection to the calling process and the process 200 ends.

Returning to the initial determination 206 of whether a secure communication session exists, where the connection manager determines 206 that a secure communication session exists between the client and the server, the connection manager determines 220 whether the received security certificate matches a pinned security certificate of the server. For example, the connection manager can execute a byte-by-byte comparison of the two security certificates and can determine 220 that a match exists only where no difference between the two security certificates is found. Conversely, in this example, where a difference between the two security certificates is found, the connection manager determines 220 that no match exists.

Where the connection manager determines 220 that the security certificates match, the connection manager establishes 214 the secure connection between the client and the server requested in the received connection request. Where the connection manager determines 220 that the security certificates do not match, the connection manager terminates 222 the secure communication session (and optionally including all of the secure connections within the secure communication session), responds 216 to the connection request with an indication of failure to establish a secure connection with the server, and the process 200 ends.

Processes in accordance with the process 200 enable the system 100 to efficiently establish multiple secure connections between clients and service via dynamic pinning, as described herein.

Figure 3:
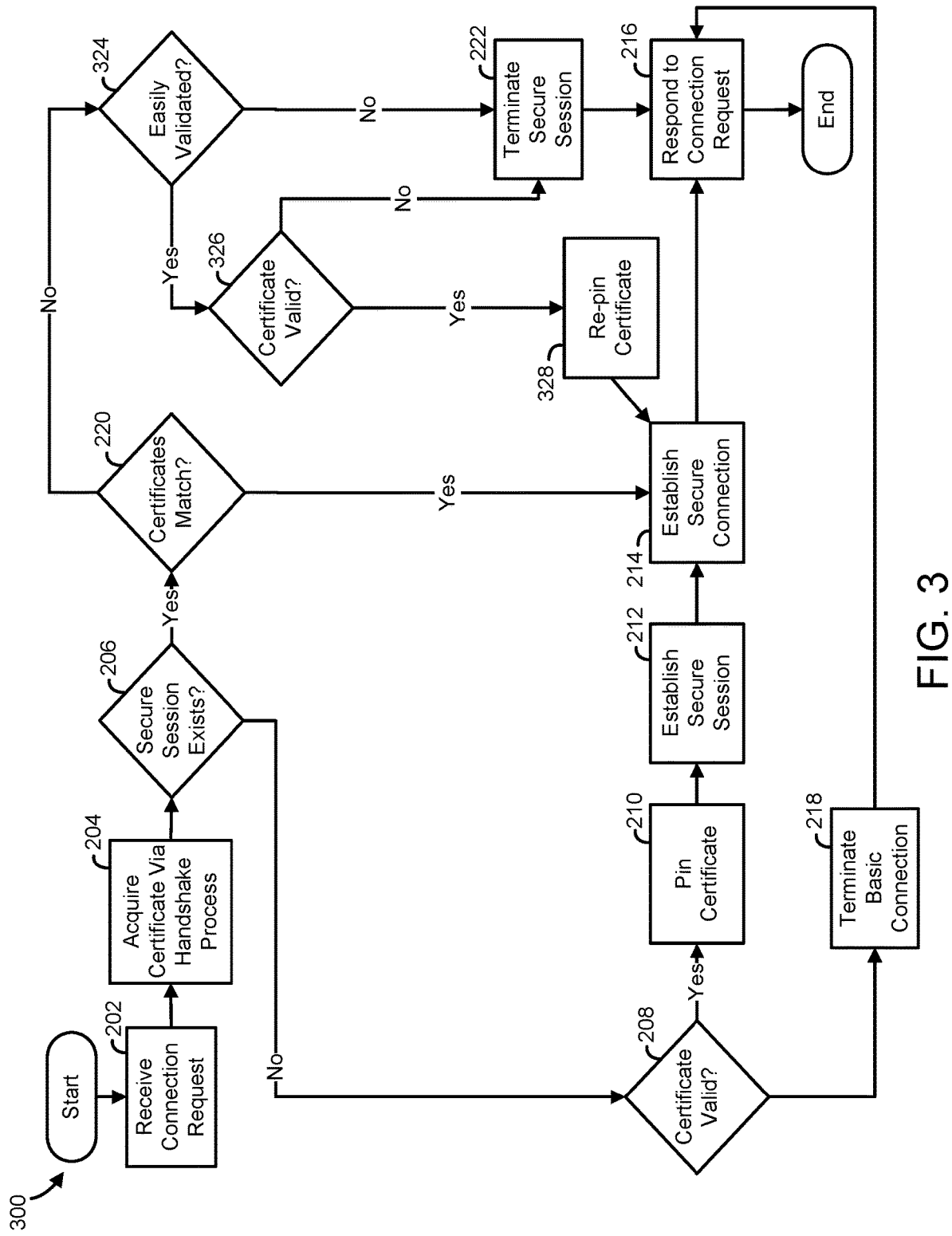
FIG. 3 is a flow diagram of another dynamic certificate pinning process in accordance with an example of the present disclosure.

As described above, some examples of the system 100 of FIG. 1 are configured to execute dynamic certificate re-pinning processes. These processes may be executed via one or more processors of any suitable type (e.g., processor 403 of FIG. 4, which is described further below). FIG. 3 illustrates a dynamic re-pinning process 300 executed by the system 100 in some examples.

As illustrated in FIG. 3, the process 300 includes the actions of the process 200 described above with reference to FIG. 2. For purposes of brevity, a description of the actions of the process 200 will not be repeated with reference to FIG. 3, but the actions of the process 200 illustrated in FIG. 3 perform the same actions within the process 300 as within the process 200.

Within the process 300, in the case of mismatched security certificates, the connection manager further determines 324 whether the requested secure connection can be easily validated. For example, the connection manager can determine whether the requested secure connection is a high-level secure connection (e.g., a TLS connection) that supports full security certificate validation. Where the requested connection is a high-level secure connection, the connection manager determines 324 that the requested secure connection can be easily validated. However, where the requested secure connection is a low-level secure connection (e.g., a TCP circuit connection), the connection manager determines 324 that requested secure connection cannot be easily validated because customized (non-standard) validation processes must be executed.

Where the connection manager determines 324 that the receive security certificate can be easily validated, the connection manager determines 326 whether the security certificate is valid. For example, the connection manager can perform a full TLS validation by calling various standardized TLS library functions. Where the connection manager determines 326 that the certificate is not valid, the connection manager proceeds to terminate 222 the secure communication session. Where the connection manager determines 326 that the certificate is valid, the connection manager re-pins 328 the received security certificate in place of the currently pinned security certificate. For example, the connection manager can overwrite the pinned security certificate with the received security certificate.

Processes in accordance with the process 200 enable the system 100 to efficiently establish multiple secure connections between clients and service via dynamic re-pinning, as described herein. Dynamic re-pinning enables the system 100 to efficiently handle situations in which a security certificate of a server changes (e.g., due to expiration) during a secure communication session.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Dynamic Pinning and Re-Pinning

Figure 4:
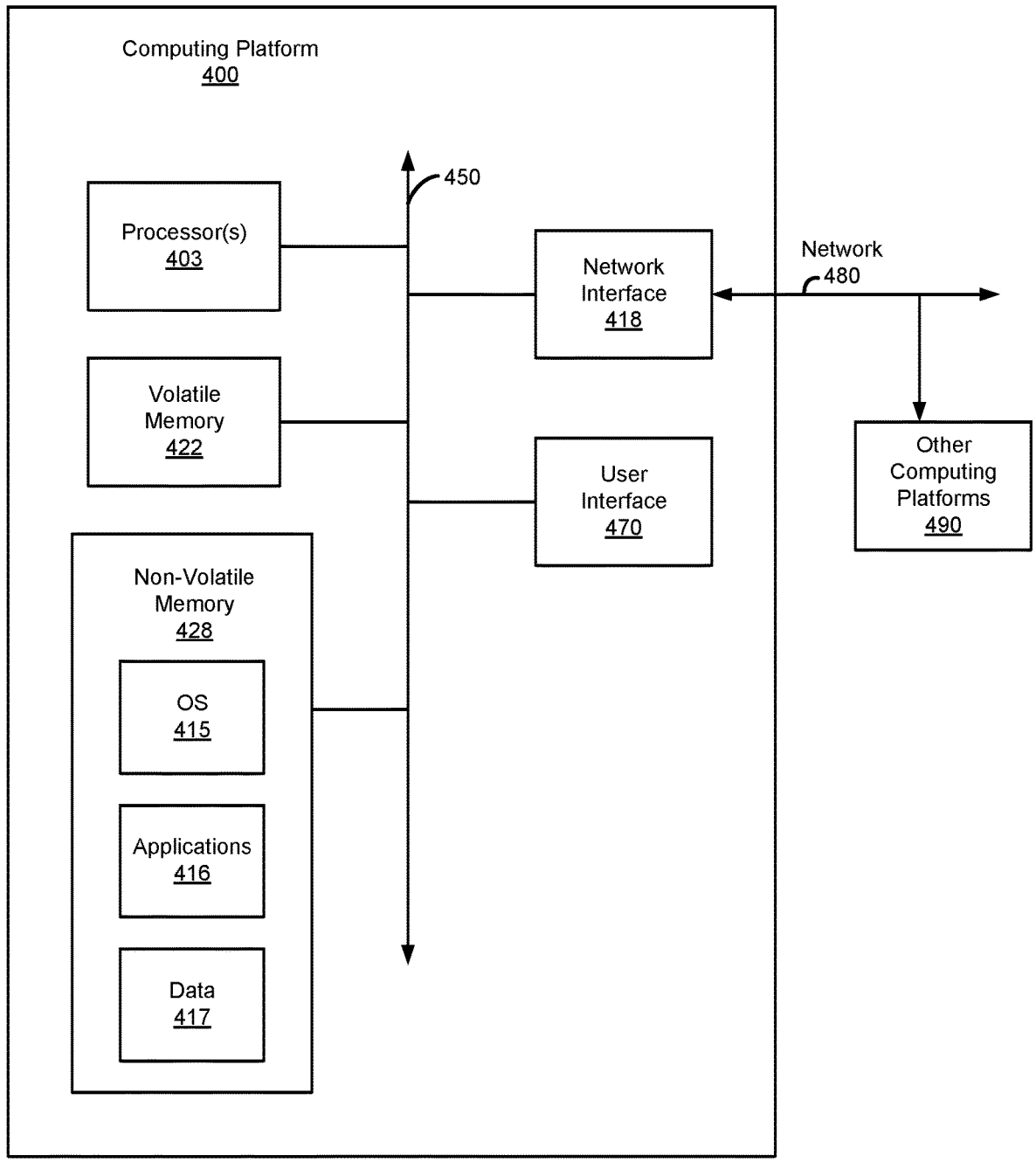
FIG. 4 is a block diagram of a computing platform that can be configured to implement various dynamic certificate pinning systems and processes in accordance with examples of the present disclosure.

FIG. 4 is a block diagram of a computing platform 400 configured to implement various dynamic certificate pinning and re-pinning systems and processes in accordance with examples disclosed herein.

The computing platform 400 includes one or more processors 403, volatile memory 422 (e.g., random access memory (RAM)), non-volatile memory 428, a user interface (UI) 470, one or more network or communication interfaces 418, and a communications bus 450. The computing platform 400 may also be referred to as a computer or a computer system.

The non-volatile (non-transitory) memory 428 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 470 can include a graphical user interface (GUI) (e.g., a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, etc.).

The non-volatile memory 428 stores an operating system 415, one or more applications or programs 416, and data 417. The operating system 415 and the application 416 include sequences of instructions that are encoded for execution by processor(s) 403. Execution of these instructions results in manipulated data. Prior to their execution, the instructions can be copied to the volatile memory 422. In some examples, the volatile memory 422 can include one or more types of RAM and/or a cache memory that can offer a faster response time than a main memory. Data can be entered through the user interface 470 or received from the other I/O device(s), such as the network interface 418. The various elements of the platform 400 described above can communicate with one another via the communications bus 450.

The illustrated computing platform 400 is shown merely as an example client device or server and can be implemented within any computing or processing environment with any type of physical or virtual machine or set of physical and virtual machines that can have suitable hardware and/or software capable of operating as described herein.

The processor(s) 403 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 403 can be analog, digital or mixed. In some examples, the processor 403 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 418 can include one or more interfaces to enable the computing platform 400 to access a computer network 480 such as a Local Area Network (LAN), a Wide Area Network (WAN), a Personal Area Network (PAN), or the Internet through a variety of wired and/or wireless connections, including cellular connections. In some examples, the network 480 may allow for communication with other computing platforms 490, to enable distributed computing.

In described examples, the computing platform 400 can execute an application on behalf of a user of a client device. For example, the computing platform 400 can execute one or more virtual machines managed by a hypervisor. Each virtual machine can provide an execution session within which applications execute on behalf of a user or a client device, such as a hosted desktop session. The computing platform 400 can also execute a terminal services session to provide a hosted desktop environment. The computing platform 400 can provide access to a remote computing environment including one or more applications, one or more desktop applications, and one or more desktop sessions in which one or more applications can execute.

Figure 5:
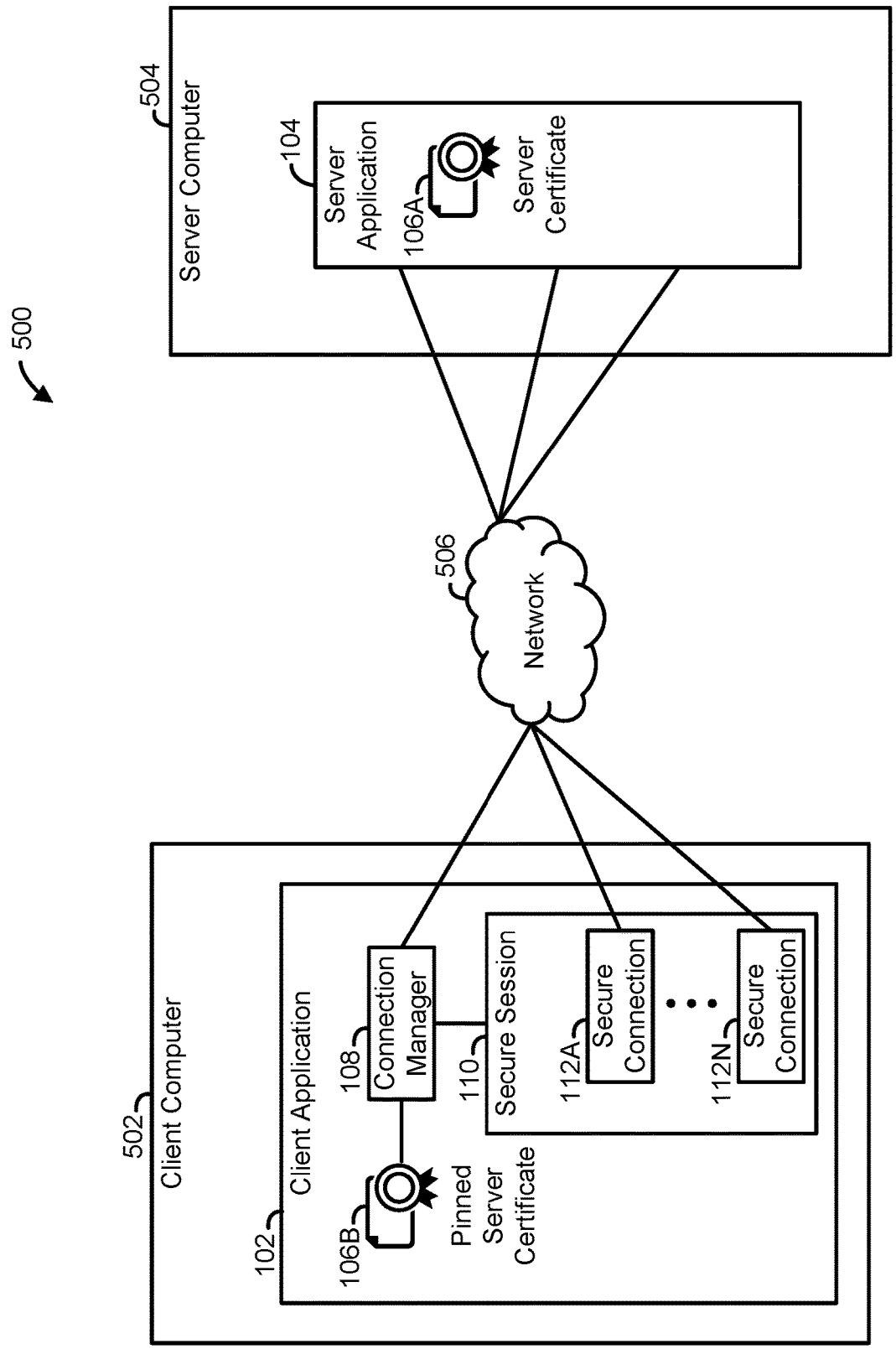
FIG. 5 is a block diagram of the dynamic certificate pinning system of FIG. 1 as implemented by a specific configuration of the computing platform of FIG. 4 in accordance with an example of the present disclosure.

FIG. 5 illustrates a dynamic certificate pinning system (e.g., the system 100 of FIG. 1) configured for operation within a distributed computing platform (e.g. the computing platform 400 of FIG. 4). As shown in FIG. 5, configuration 500 includes a client computer 502 and a server computer 504. Within the configuration 500, the computer systems 502 and 504 are communicatively coupled to one another and exchange data via a network 506.

As illustrated in FIG. 5, the client computer 502 is configured to host the client application 102 of FIG. 1. The server computer 504 is configured to host the server application 104 of FIG. 1. Many of the components illustrated in FIG. 5 are described above with reference to FIG. 1. For purposes of brevity, those descriptions will not be repeated here, but each of the components of FIG. 1 included in FIG. 5 is configured to function with reference to FIG. 5 as described with reference to FIG. 1. However, the descriptions of any of these components may be augmented or refined below.

In at least some examples in accordance with FIG. 5, the configuration 500 implements a Citrix® Workspace™ application installation. In these examples, the client application 102 can include a Citrix® Workspace™ client application installation and the server application 104 can include a Citrix® Workspace™ hub service. In this configuration, the client application 102 makes multiple secure connections to the client application 102, where some of the subsequent connections are easily verifiable and some are not. For instance, the client application 102 can make connections to the server application to be used for a screen casting. In this example, the client application 102 fully validates an initial secure connection to a server application 104 and pins the security certificate of the server application in memory. Subsequent secure connections (some of which are easily verifiable and some of which are low-level secure transports that are not easily verifiable) are then validated by the client application 102 by matching received copies of the server security certificate with the pinned security certificate.

The configuration 500 is but one example of many potential configurations that can be used to implement the system 100. As such, the examples disclosed herein are not limited to the particular configuration 500 and other configurations are considered to fall within the scope of this disclosure.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system comprising:
a memory;
a network interface; and
at least one processor coupled to the memory and the network interface and configured to:
transmit, via the network interface, a first message to a server application to initiate a handshake process with the server application;
receive, via the network interface, a first copy of a security certificate from the server application;
determine whether the first copy is valid;
store, in response to a determination that the first copy is valid, the first copy in the memory;
establish, in response to the determination that the first copy is valid, an initial secure connection to the server application;
establish, in response to the determination that the first copy is valid, a secure communication session with the server application, the secure communication session comprising the initial secure connection;
transmit, via the network interface, a second message to the server application to request a subsequent secure connection to the server application;
receive, via the network interface, a second copy of the security certificate from the server application;
determine whether the second copy matches the first copy;
determine, in response to a determination that the second copy does not match the first copy, whether the second copy is valid;
replace in the memory, in response to a determination that the second copy is valid, the first copy with the second copy by overwriting the first copy in the memory with the second copy;
establish, in response to one of a determination that the second copy matches the first copy or the determination that the second copy is valid, the subsequent secure connection to the server application; and
add, in response to the one of the determination that the second copy matches the first copy or the determination that the second copy is valid, the subsequent secure connection to the secure communication session.

2. The computer system of claim 1, wherein the at least one processor is configured to determine whether the second copy matches the first copy by determining whether no differences between the second copy and the first copy exist.

3. The computer system of claim 1, wherein the subsequent secure connection is a low-level connection.

4. The computer system of claim 1, wherein the memory stores no copies of the security certificate prior to transmitting the first message.

5. The computer system of claim 1, wherein to determine whether the second copy is valid, the at least one processor is further configured to:
determine, in response to the determination that the second copy does not match the first copy, whether the subsequent secure connection is a high-level connection; and
determine via the high-level connection, in response to a determination that the subsequent secure connection is a high-level secure connection, whether the second copy is valid.

6. The computer system of claim 1, wherein to determine whether the first copy is valid comprises to execute a transport layer security validation of the first copy.

7. The computer system of claim 1, wherein the secure communication session comprises an expiration time.

8. A method of establishing secure connections using dynamic pinning within a computer system, the method comprising:
transmitting, via a network interface of the computer system, a first message to a server application to initiate a handshake process with the server application;
receiving, via the network interface, a first copy of a security certificate from the server application;
determining that the first copy is valid;
storing, in response to the determination that the first copy is valid, the first copy in a memory of the computer system;
establishing, in response to the determination that the first copy is valid, an initial secure connection to the server application;
establishing, in response to the determination that the first copy is valid, a secure communication session with the server application, the secure communication session comprising the initial secure connection;
transmitting, via the network interface, a second message to the server application to request a subsequent secure connection to the server application;
receiving, via the network interface, a second copy of the security certificate from the server application;
determining whether the second copy matches the first copy;

establishing, in response to a determination that the second copy matches the first copy, the subsequent secure connection to the server application;
establishing, in response to a determination that the second copy does not match the first copy, whether the second copy is valid;
replacing in the memory, in response to a determination that the second copy is valid, the first copy with the second copy by overwriting the first copy in the memory with the second copy; and
adding, in response to one of the determination that the second copy matches the first copy or the determination that the second copy is valid, the subsequent secure connection to the secure communication session.

9. The method of claim 8, wherein determining whether the second copy matches the first copy comprises comparing the second copy to the first copy byte-by-byte.

10. The method of claim 8, wherein transmitting the second message to the server application comprises transmitting a second message to request a low-level connection.

11. The method of claim 8, further comprising:
in response to the determination that the second copy does not match the first copy;
determining that the subsequent secure connection is a high-level connection; and
determining that the second copy is valid via the high-level connection.

12. The method of claim 8, wherein determining whether the first copy is valid comprises executing a full transport layer security validation of the first copy.

13. The method of claim 8, wherein establishing the secure communication session comprises storing an expiration time in association with the secure communication session.

14. A non-transitory computer readable medium storing executable sequences of instructions to establishing secure connections using dynamic pinning, the sequences of instructions comprising instructions to:
transmit, via a network interface, a first message to a server application to initiate a handshake process with the server application;
receive, via the network interface, a first copy of a security certificate from the server application;
determine whether the first copy is valid;
store, in response to a determination that the first copy is valid, the first copy in a memory;
establish, in response to the determination that the first copy is valid, an initial secure connection to the server application;
establish, in response to the determination that the first copy is valid, a secure communication session with the server application, the secure communication session comprising the initial secure connection;
transmit, via the network interface, a second message to the server application to request a subsequent secure connection to the server application;
receive, via the network interface, a second copy of the security certificate from the server application;
determine whether the second copy matches the first copy;
determine, in response to a determination that the second copy does not match the first copy, whether the second copy is valid;
replace in the memory, in response to a determination that the second copy is valid, the first copy with the second copy by overwriting the first copy in the memory with the second copy;
establish, in response to one of a determination that the second copy matches the first copy or the determination that the second copy is valid, the subsequent secure connection to the server application; and
add, in response to the one of the determination that the second copy matches the first copy or the determination that the second copy is valid, the subsequent secure connection to the secure communication session.

15. The computer readable medium of claim 14, wherein the instructions to transmit the second message to the server application comprise instructions to transmit a second message to request a low-level connection.

16. The computer readable medium of claim 14, wherein the instructions to determine whether the second copy is valid comprise instructions to:
determine, in response to the determination that the second copy does not match the first copy, whether the subsequent secure connection is a high-level connection; and
in response to a determination that the subsequent secure connection is a high-level secure connection, determine via the high-level secure connection whether the second copy is valid.

17. The computer readable medium of claim 14, wherein the instructions to establish the secure communication session comprises instructions to store an expiration time in association with the secure communication session.

* * * * *